United States Patent
Zhang et al.

(10) Patent No.: US 8,327,125 B2
(45) Date of Patent: Dec. 4, 2012

(54) CONTENT SECURING SYSTEM

(75) Inventors: Jiang Zhang, La Jolla, CA (US);
Kun-Pei P. Chen, San Diego, CA (US);
Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 388 days.

(21) Appl. No.: 12/647,865

(22) Filed: Dec. 28, 2009

(65) Prior Publication Data

US 2011/0161645 A1    Jun. 30, 2011

(51) Int. Cl.
*G06F 9/24* (2006.01)
*G06F 15/177* (2006.01)
*H04L 9/32* (2006.01)

(52) U.S. Cl. ............ 713/2; 713/1; 713/176; 713/181; 713/189; 713/193

(58) Field of Classification Search ............... 713/1, 2, 713/176, 181, 189, 193
See application file for complete search history.

(56) References Cited

U.S. PATENT DOCUMENTS

| | | | |
|---|---|---|---|
| 2005/0188274 A1* | 8/2005 | Vedam et al. | 714/39 |
| 2006/0026417 A1* | 2/2006 | Furusawa et al. | 713/2 |
| 2006/0277419 A1* | 12/2006 | McNulty et al. | 713/193 |
| 2007/0006307 A1* | 1/2007 | Hahn et al. | 726/22 |
| 2009/0193230 A1* | 7/2009 | Findeisen et al. | 712/34 |

* cited by examiner

*Primary Examiner* — Vincent Tran
(74) *Attorney, Agent, or Firm* — Thomas A. Ward (57) ABSTRACT

In a method for securing content in a system containing a security processor configured to control access to the content by a main processor, in which main processor being configured to send heartbeats to the security processor, a determination as to whether at least one heartbeat was received within a predicted time interval is made and in response to a determination that at least one heartbeat was not received with the predicted time interval, access to the content by the main processor is ceased.

18 Claims, 5 Drawing Sheets

CONTENT SECURING SYSTEM

BACKGROUND

Some set-top boxes and other electronic devices use a multi-processor computer chip, such as a Secure Media Processor chip, which uses a multiprocessor computer architecture. In secure multiprocessor computer chip architectures, a security processor and a main processor are typically connected to a single main memory. As the name suggests, the security processor is more secure and less vulnerable to attack by a hacker than the main processor.

The security processor functions to control a boot-up process of the main processor as well as access to encrypted content by the main processor. During a boot-up process, the security processor boots up first to authenticate the main processor's code and then the authenticated code is loaded into the main processor to run. In addition, for the main processor to access encrypted content, the security processor issues keys for a decryption engine to decrypt the content to be accessible to the main processor. As such, if the security processor stops issuing the keys, access to the encrypted content by the main processor is ceased.

In various instances, a hacker may be able to activate a debugging function on the main processor during the boot-up operation. Oftentimes, due to chip design architecture, for instance, the debug function of the main processor may not be disabled. This unauthorized access may allow a hacker to modify code of the main processor to gain access to private information or other protected content.

SUMMARY

Disclosed herein is a method for securing content in a system containing a security processor configured to control access to the content by a main processor, in which the main processor is configured to send heartbeats to the security processor. In the security processor, a determination as to whether at least one heartbeat was received within a predicted time interval is made and, in response to a determination that at least one heartbeat was not received with the predicted time interval, access to the content by the main processor is ceased.

Also disclosed herein is a security processor that includes one or more modules configured to receive heartbeats from a main processor, to determine whether at least one heartbeat was received within a predicted time interval, and in response to a determination that at least one heartbeat was not received within the predicted time interval, to cease access to the content by the main processor.

Further disclosed is a computer readable storage medium on which is embedded one or more computer programs. The one or more computer programs implement a method for securing content in a system containing a security processor configured to control access to the content by a main processor, in which the main processor is configured to send heartbeats to the security processor. The one or more computer programs include a set of instructions for determining whether at least one heartbeat was received within a predicted time interval and, in response to a determination that at least one heartbeat was not received with the predicted time interval, ceasing access to the content by the main processor.

Through implementation of the method and security processor disclosed herein, content is securely protected in a system containing the security processor configured to control access to the content by a main processor. More particularly, the method and security processor disclosed herein are configured to identify when a main processor is likely to have been attacked by a hacker and to cease access to encrypted content by the main processor when such a determination is made. According to a first embodiment, the security processor is configured to determine that the main processor has been attacked in the event that the time required for the boot-up process of the main processor exceeds a predetermined value. In another embodiment, the security processor is configured to determine that the main processor has been attacked in the event that the main processor fails to send one or more heartbeats within a predetermined interval of time.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Figure 1:
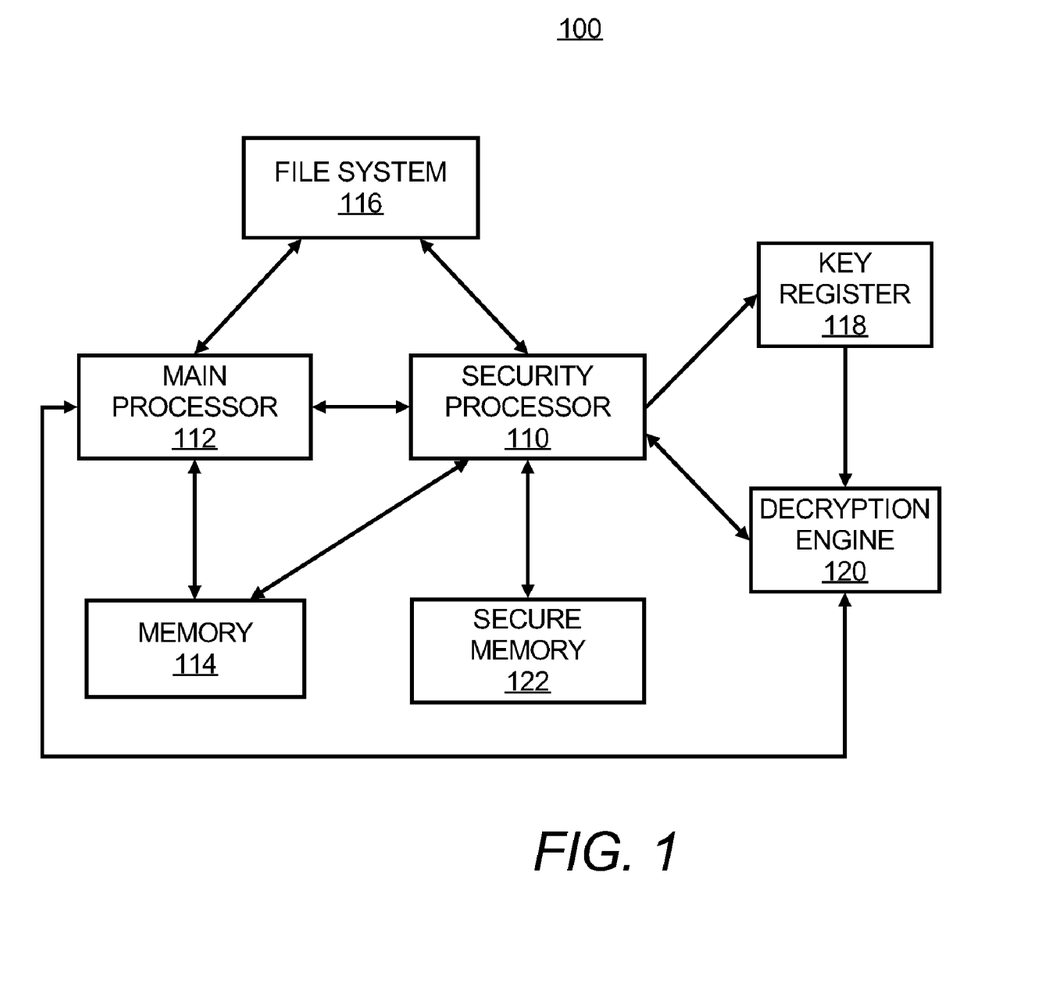
FIG. 1 illustrates a block diagram of a system, according to an embodiment of the present invention.

With reference first to FIG. 1, there is shown a block diagram of a content securing system 100, according to an embodiment of the present invention. It should be apparent to those of ordinary skill in the art that the block diagram of FIG. 1 represents a generalized illustration and that other components may be added or existing components may be removed, modified or rearranged without departing from a scope of the content securing system 100.

The content securing system 100 is depicted as including a security processor 110, a main processor 112, a memory 114, a file system 116, a key register 118, a decryption engine 120, and a secure memory 122. As discussed in greater detail herein below, the security processor 110 is configured to cause the decryption engine 120 to receive decryption keys (not shown) from the key register 118. The decryption engine 120 may decrypt encrypted content received from the main processor 112 using the decryption keys. In addition, the security processor 110 may store the decrypted content in the memory 114. The security processor 110 may also store the decryption keys in the secure memory 122, which is not accessible by the main processor 112. In one embodiment, the security processor 110 is integrated on a chip with the main processor 112. In another embodiment, the security processor 110 comprises an add-on component to a chip containing the main processor 112.

In one regard, the security processor 110 has a debug function that may be deactivated. However, the debug function of the main processor 112 may not be deactivated. The security processor 110 generally operates to control access to encrypted content contained in the file system 116 or from a network (not shown) by the main processor 112 by controlling the access and communication of keys to the decryption engine 120 for decrypting the encrypted content. Thus, if the security processor 110 stops allowing the decryption engine 120 from getting the decryption keys, the main processor 112 is unable to access the encrypted content.

The security processor 110 is configured to cease access to the encrypted content by the main processor 112, for instance, by ceasing the supply of keys to the decryption engine 120, by resetting the main processor 112, etc., under a number of circumstances. According to an embodiment, the security processor 110 is configured to cease access to the encrypted content by the main processor 112 when the amount of time required for the main processor 112 to boot up exceeds a predetermined level. According to another embodiment, the security processor 110 is configured to cease access to the encrypted content when the main processor 112 fails to communicate a heartbeat message within a predetermined interval of time. According to a further embodiment, the security processor 110 is configured to cease access to the encrypted content when the main processor 112 communicates an improper signature and/or security processor 110 generated value.

Figure 2:
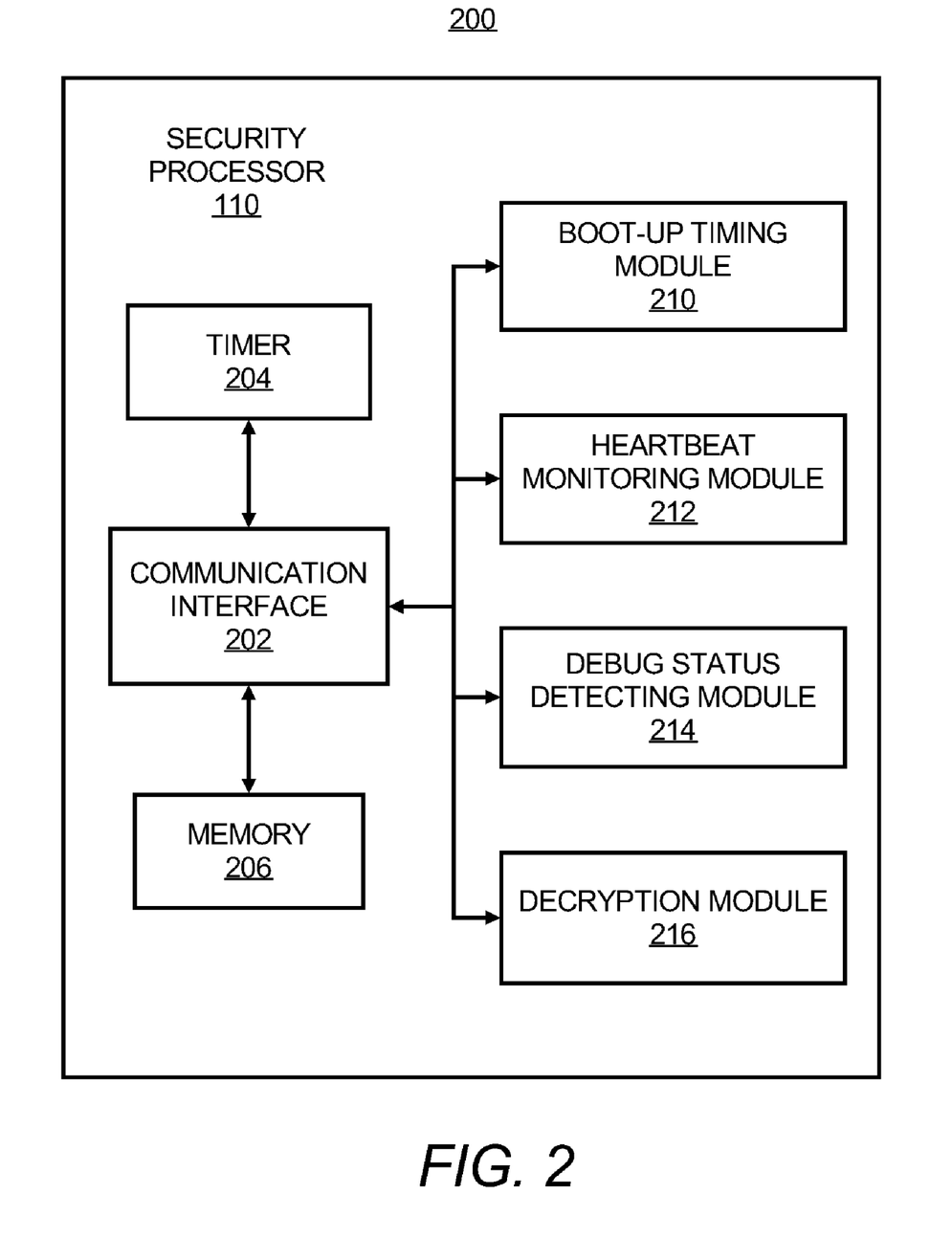
FIG. 2 shows a block diagram of the security processor depicted in FIG. 1, according to an embodiment of the present invention.

With particular reference now to FIG. 2, there is shown a block diagram 200 of the security processor 110 depicted in FIG. 1, according to an embodiment of the invention. It should be apparent to those of ordinary skill in the art that the block diagram 200 of the security processor 110 represents a generalized illustration and that other components may be added or existing components may be removed, modified or rearranged without departing from a scope of the security processor 110.

As shown in FIG. 2, the security processor 110 includes a communication interface 202, a timer 204, a memory 206, a boot-up timing module 210, a heartbeat monitoring module 212, a debug status detecting module 214, and a decryption module 216. The memory 206 may comprise either of the memory 114 or the secure memory 122 depicted in FIG. 1. The modules 210-216 may comprise software modules, hardware modules, or a combination of software and hardware modules. Thus, in one embodiment, one or more of the modules 210-216 comprise circuit components. In another embodiment, one or more of the modules 210-216 comprise software code stored on a computer readable storage medium, which is executable by a processor.

Figure 3:
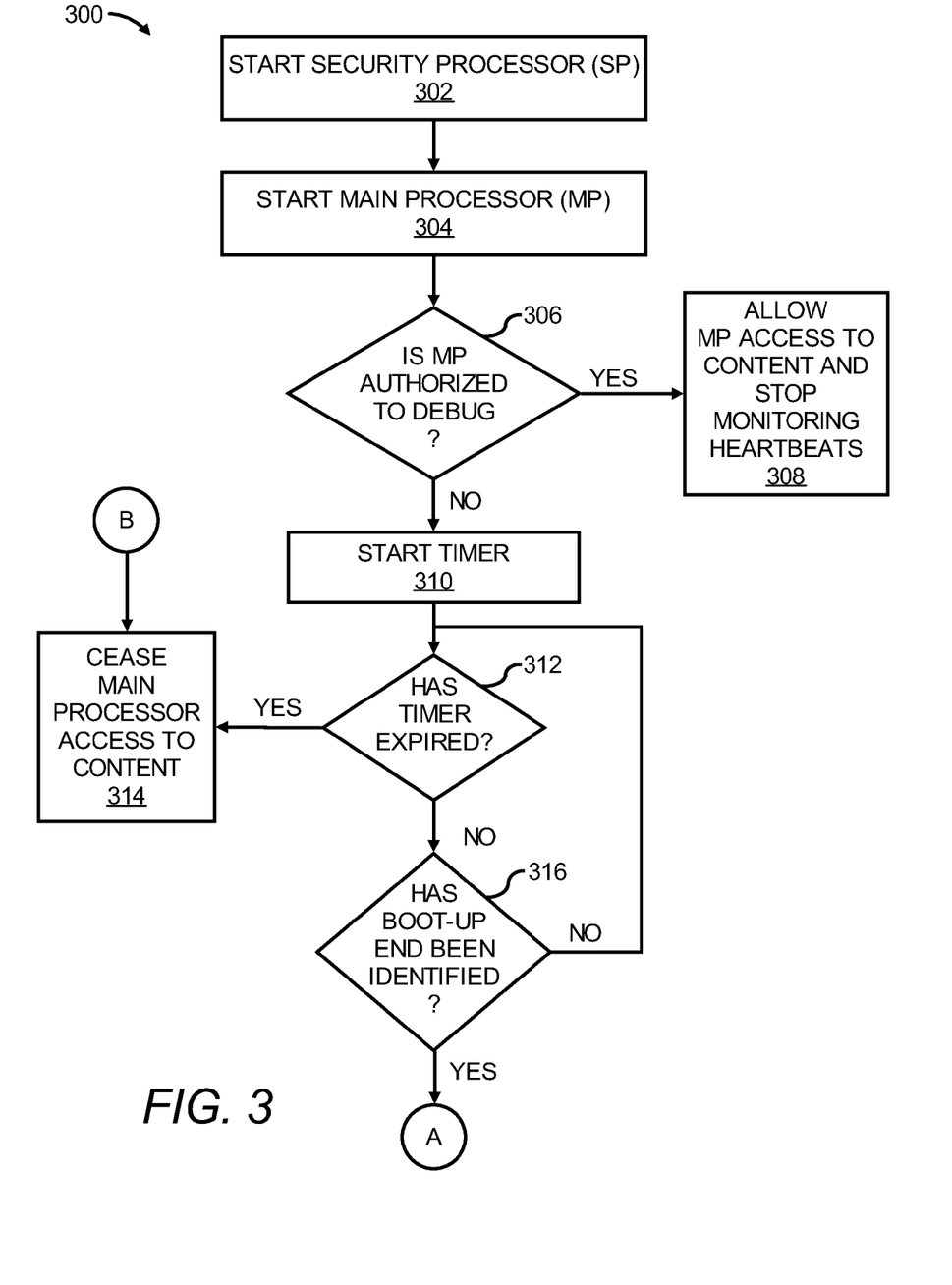
FIGS. 3 and 4, collectively, illustrate a flow diagram of a method for securing content in a system, according to an embodiment of the present invention.
Figure 4:
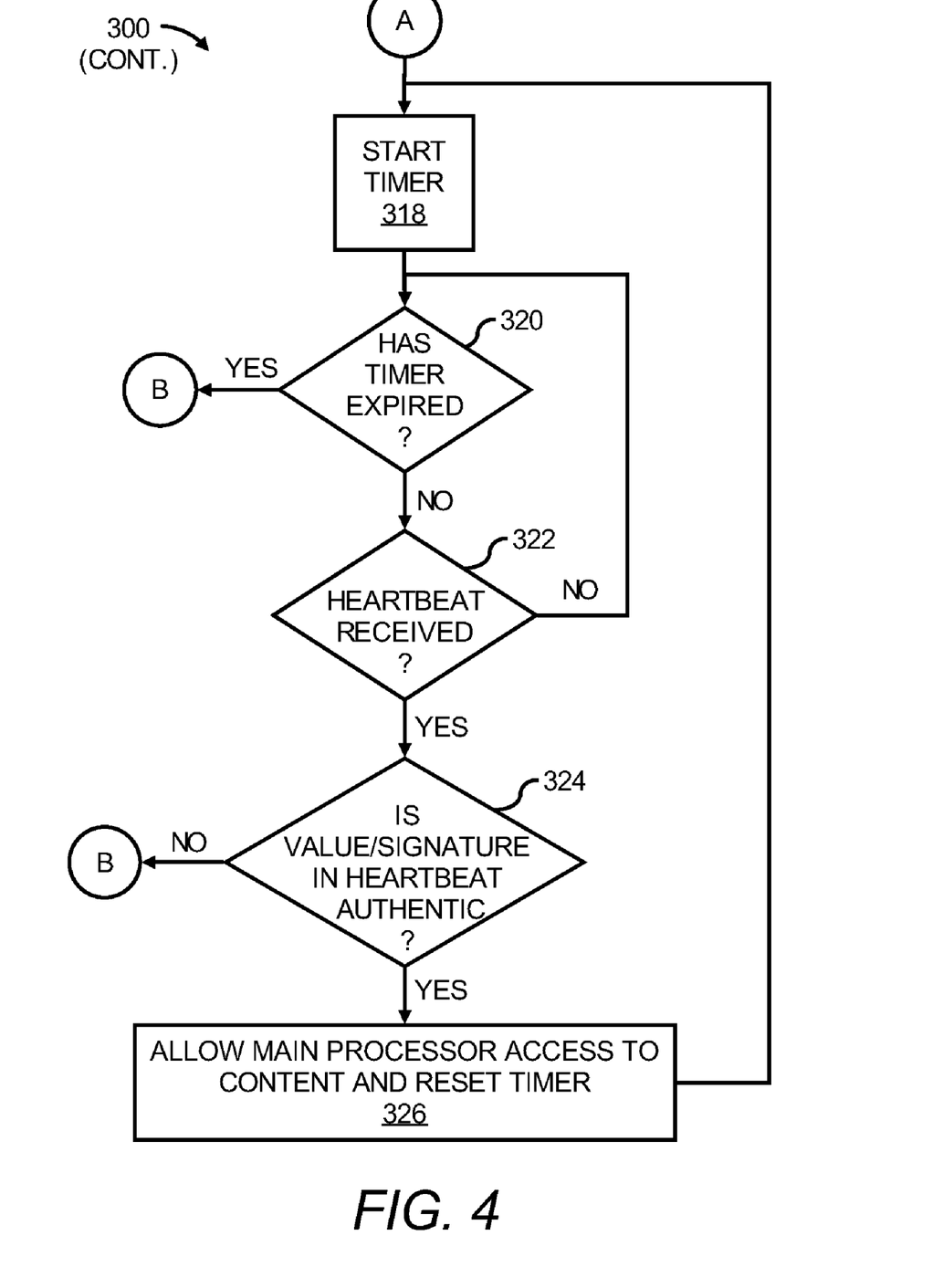

Various manners in which the modules 210-216 of the security processor 110 may be implemented are described in greater detail with respect to FIGS. 3 and 4, which collectively depict a flow diagram of a method 300 for securing content in a system, according to an embodiment. It should be apparent to those of ordinary skill in the art that the method 300 represents a generalized illustration and that other steps may be added or existing steps may be removed, modified or rearranged without departing from a scope of the method 300.

The description of the method 300 is made with particular reference to the security processor 110 depicted in FIGS. 1 and 2 and thus makes particular reference to the elements contained in the security processor 110. It should however, be understood that the method 300 may be implemented in an apparatus that differs from the security processor 110 without departing from a scope of the method 300.

As shown therein, at step 302, the security processor 110 is started. In addition, at step 304, the main processor 112 is started. More particularly, for instance, the security processor 110 and the main processor 112 are started from an off state and may thus be booted up.

At step 306, a determination as to whether the main processor 112 is in an authorized debugging state is made, for instance by the debug status detecting module 214. More particularly, for instance, the security processor 110 may determine that the main processor 112 is in an authorized debugging state if the security processor 110 was previously instructed by an authorized user that the main processor 112 is being placed in the debugging state. Thus, for instance, the authorized user may require the correct code with the security processor 110 to place the main processor 112 into an authorized debugging state.

In the event that the debug status detecting module 214 determines that the main processor 112 is in an authorized debugging state at step 306, the security processor 110, and more particularly, the decryption module 216, may disable a requirement that the at least one heartbeat be received prior to expiration of the timer 204 for access to content by the main processor to continue. Thus, for instance, the security processor 110 may continue to retrieve and communicate keys for the decryption engine 120. In the event, however, that the debug status detecting module 214 determines that the main processor 112 is not in an authorized debugging state at step 306, a timer 204 is initiated, as indicated at step 310, for instance, by the boot-up timing module 210. The timer 204 may be set to a time period that is based upon, for instance, the lengths of times of previous boot-ups that did not encounter security issues, manufacturer issued start-up times, etc.

In addition, at step 312, a determination as to whether the timer 204 has expired is made, for instance, by the boot-up timing module 210. If during a first or subsequent iteration of step 312, the timer 204 is determined to have expired prior to completion of the boot-up process, access to the encrypted content by the main processor 112 is ceased at step 314. As discussed above, the access to the encrypted content may be ceased by the security processor 110, and more particularly, by the decryption module 216, by ceasing retrieval and transmittal of keys for decrypting the encrypted content to the decryption engine 120, by resetting the main processor, etc.

If the timer 204 has not expired at step 312, the security processor 110 determines whether the boot-up process has ended as indicated at step 316. The security processor 110 may determine that the boot-up process has ended through receipt of a message that indicates that the boot-up process has ended. If the boot-up process has not ended, the security processor 110 continues to determine whether the timer 204 has expired, as indicted at step 312.

If, however, the boot-up ends prior to expiration of the timer 204, the security processor 110, and more particularly, the heartbeat monitoring module 212, may initiate a timer 204 at step 318 to determine whether heartbeats from the main processor 112 are received within predetermined periods of time. In addition, at step 320, the heartbeat monitoring module 212 determines whether the timer 204 has expired. According to an embodiment, the length of time that the timer 204 is to run prior to expiration may be selected to be sufficiently short to render it relatively impossible for code of the main processor 112 to be modified between the intervals of time, such as, for instance, intervals of about 5 ms. If, during a first or subsequent iteration of step 320, the timer 204 is determined to have expired prior to receipt of a heartbeat, access to the content by the main processor 112 may be ceased, as discussed above with respect to step 314.

If, however, the timer 204 has not expired, at step 322, the heartbeat monitoring module 212 may determine whether a heartbeat has been received from the main processor 112. According to an example, the security processor 112 receives the heartbeats through the communication interface 202. In addition, the heartbeats may contain various information for the security processor 110 to verify whether the heartbeat message has been newly generated by an authentic main processor. For instance, the heartbeat monitoring module 212 may generate a new random value and may include this random value in a message communicated to the main processor 112 as the response to the heartbeat message received from the main processor 112. In this example, the main processor 112 may be configured to include the random value in encrypted format in the heartbeat sent to the security processor 110 as an option. The random value may be used in the next heartbeat and the security processor 110 may determine that the main processor 112 actually received the last message and that the received heartbeat is a newly generated one from the random value received from the main processor 112. In addition, or alternatively, the main processor 112 may be configured to include a signature in the heartbeat.

According to an embodiment, at step 324, the security processor 110 verifies the signature and/or analyzes the data contained in heartbeats received from the main processor 112 in determining the authenticity of the main processor 112. More particularly, the heartbeat monitoring module 212 determines whether the main processor 112 that communicated the heartbeats is authentic based upon the information contained in the heartbeats. More particularly, for instance, and as discussed above, the heartbeat monitoring module 212 determines whether the heartbeat includes the correct random value, which may be in encrypted format. As another example, the heartbeat monitoring module 212 determines whether the heartbeats contain the correct signatures. More particularly, for instance, the security processor 110 and the main processor 112 may exchange a short-term signing and/or encryption key before the heartbeats are sent to each other. In this example, the key exchange may occur during an initial boot-up using a key exchange algorithm, such as Diffie-Hellman (DH) or Elliptic Curve Diffie-Hellman (ECDH). In addition, other long-term keys may be used to authenticate the short-term key exchange messages, and the long-term keys may be exchanged in the device manufacturing time.

In the event that the heartbeat monitoring module 212 determines that either or both of the value and the signature contained in the heartbeats are improper, the security processor 110 ceases access to the content by the main processor 112, as indicated at step 314 (FIG. 3). Otherwise, the security processor 110 may allow access to the content by the main processor as indicated at step 326.

Following step 326, the security processor 110 may continue to receive and track receipt of the heartbeats from the main processor 112 at steps 318-326 and may continuously repeat steps 318-326 until step 314 is reached or until the security processor 110 and main processor 112 are deactivated.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
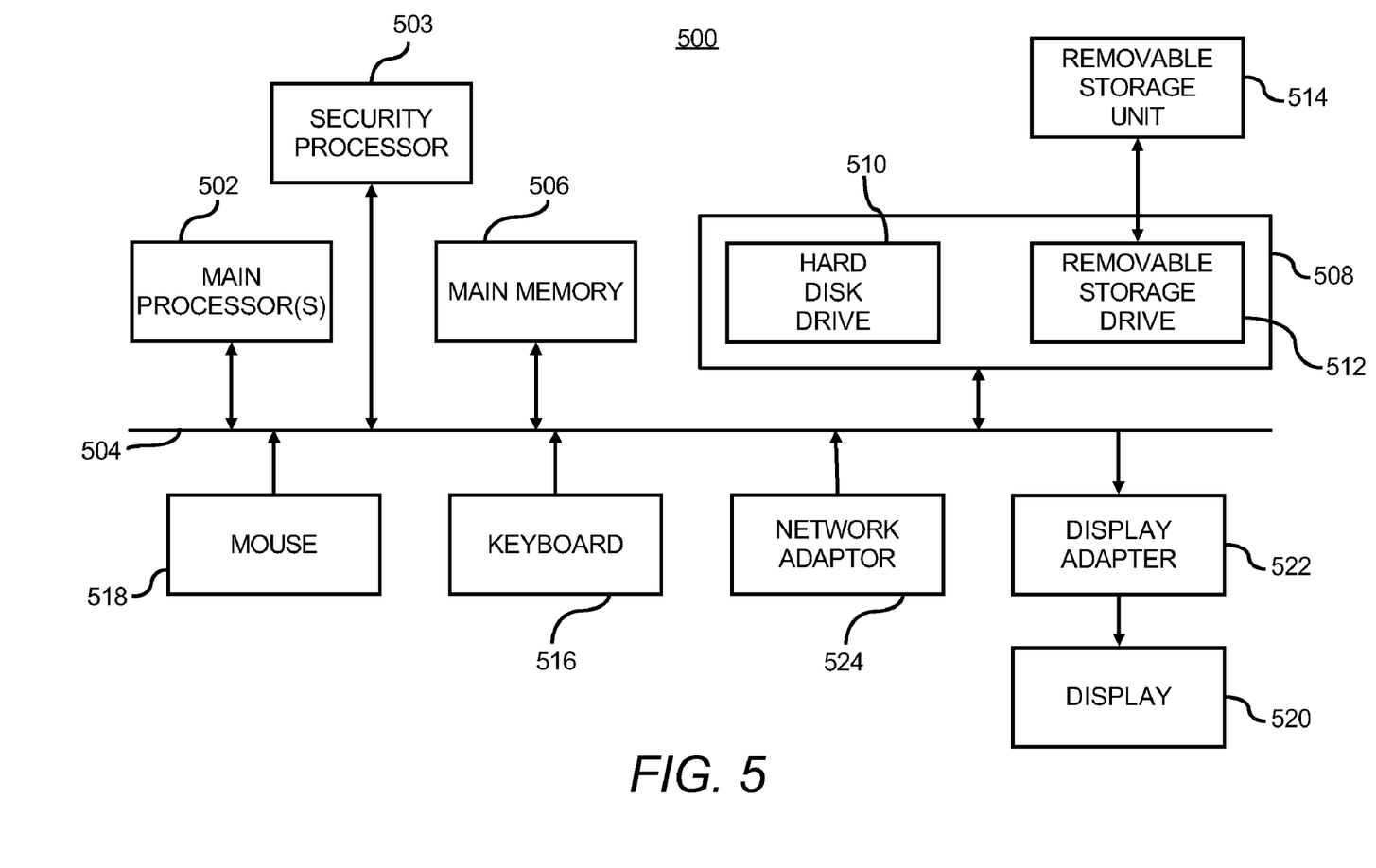
FIG. 5 shows a block diagram of a computer system that may be used as a platform for implementing or executing one or more of the processes depicted in FIGS. 3 and 4, according to an embodiment of the present invention.

FIG. 5 illustrates a block diagram of a computing apparatus 500 configured to implement or execute one or more of the processes depicted in FIGS. 3 and 4, according to an embodiment. It should be understood that the illustration of the computing apparatus 500 is a generalized illustration and that the computing apparatus 500 may include additional components and that some of the components described may be removed and/or modified without departing from a scope of the computing apparatus 500.

The computing apparatus 500 includes a main processor 502, such as the main processor 112, and a security processor 503 that may implement or execute some or all of the steps described in one or more of the processes depicted in FIGS. 3 and 4. For example, the security processor 503 is configured to determine whether at least one heartbeat was received within a predicted time interval, and in response to a determination that a heartbeat was not received at a predicted time interval, to cease access to the content by the main processor 502.

Commands and data from the processors 502 and 503 are communicated over a communication bus 504. The computing apparatus 500 also includes a main memory 506, such as a random access memory (RAM), where the program code for the processors 502 and 503, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one or more of the processes depicted in FIGS. 3 and 4 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

Through implementation of the method and security processor disclosed herein, content is securely protected in a system containing the security processor configured to control access to the content by a main processor. More particularly, the method and security processor disclosed herein are configured to identify when a main processor is likely to have been attacked by a hacker and to cease access to encrypted content by the main processor when such a determination is made. According to a first embodiment, the security processor is configured to determine that the main processor has been attacked in the event that the time required for the boot-up process of the main processor exceeds a predetermined value. In another embodiment, the security processor is configured to determine that the main processor has been attacked in the event that the main processor fails to send one or more heartbeats within a predetermined interval of time.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for securing content in a system containing a security processor configured to control access to the content by a main processor, said method comprising:
   in the security processor:
      determining whether the main processor is in an authorized debugging state; and
      if the main processor is not in the authorized debugging state:
         receiving heartbeats from the main processor;
         determining whether at least one heartbeat is received within a predicted time interval; and
         in response to a determination that at least one heartbeat is not received within the predicted time interval, ceasing access to the content by the main processor.

2. The method according to claim 1, wherein receiving the heartbeats further comprises receiving the heartbeats during a boot-up process of the security processor and the main processor.

3. The method according to claim 2, further comprising:
   detecting that the boot-up process has been started;
   initiating a timer in response to the detection;
   determining whether a boot-up end has been identified prior to expiration of the timer; and
   in response to a determination that the boot-up end has not been identified prior to expiration of the timer, ceasing access to the content by the main processor.

4. The method according to claim 2, further comprising:
   determining that the boot-up process has ended;
   starting a timer; and
   wherein determining whether at least one heartbeat is not received within a predicted time interval further comprises determining whether at least one heartbeat is received prior to expiration of the timer.

5. The method according to claim 1, wherein the main processor is configured to include a random value in the heartbeats, said method further comprising:
   sending a message containing the random value to the main processor;
   receiving another heartbeat from the main processor;
   determining whether the another heartbeat contains the random value contained in the message; and
   in response to a determination that the another heartbeat contains a value that was not contained in the message, ceasing access to the content by the main processor.

6. The method according to claim 5, wherein the main processor is configured to encrypt the random value prior to communicating the heartbeats to the security processor, said method further comprising:
   decrypting the random value prior to sending the message containing the random value to the main processor.

7. The method according to claim 1, wherein the heartbeats contain a signature of the main processor, said method further comprising:
   evaluating the signature contained in the heartbeats through use of an exchanged key with the main processor to determine whether the heartbeats are authentic; and
   in response to a determination that at least one of the heartbeats is inauthentic, ceasing access to the content by the main processor.

8. The method according to claim 1, wherein the content comprises encrypted content, wherein the security processor is configured to issue keys to decrypt the encrypted content, and wherein ceasing access to the content by the main processor further comprises ceasing delivery of the keys to key registers of a decryption engine to which the main processor has access.

9. The method according to claim 1, wherein the predicted time interval comprises an interval of time that renders it relatively impossible for code of the main processor to be modified by a person during the interval of time.

10. A security processor comprising:
    one or more hardware modules configured to:
       determine whether a main processor is in an authorized debugging state; and
       if the main processor is not in the authorized debugging state:
          receive heartbeats from the main processor;
          determine whether at least one heartbeat is received within a predicted time interval, and
          in response to a determination that at least one heartbeat is not received within the predicted time interval, cease access to the content by the main processor.

11. The security processor according to claim 10, wherein the one or more modules are further configured to receive the heartbeats during a boot-up process of the security processor and the main processor.

12. The security processor according to claim 11, wherein the one or more modules are further configured to detect that the boot-up process has been started, to initiate a timer in response to the detection, to determine whether a boot-up end has been identified prior to expiration of the timer, and to cease access to the content by the main processor in response to a determination that the boot-up end has not been identified prior to expiration of the timer.

13. The security processor according to claim 11, wherein the one or more modules are further configured to determine that the boot-up process has ended, to start a timer in response to a determination that the boot-up process has ended, and to determine whether at least one heartbeat is received prior to expiration of the timer.

14. The security processor according to claim 10, wherein the main processor is configured to include a random value in the heartbeats, said one or more modules being further configured to send a message containing the random value to the main processor, to receive another heartbeat from the main processor, to determine whether the another heartbeat contains the random value contained in the message, and to cease access to the content by the main processor in response to a determination that the another heartbeat contains a value that was not contained in the message.

15. The security processor according to claim 14, wherein the main processor is configured to encrypt the random value prior to communicating the heartbeats to the security processor, and wherein the one or more modules are further configured to decrypt the random value prior to sending the message containing the random value to the main processor.

16. The security processor according to claim 10, wherein the heartbeats contain a signature of the main processor, said one or more modules further being configured to evaluate the signature contained in the heartbeats through use of an exchanged key with the main processor to determine whether the heartbeats are authentic, and in response to a determination that at least one of the heartbeats is inauthentic, to cease access to the content by the main processor.

17. The security processor according to claim 10, wherein the predicted interval of time comprises an interval of time that renders it relatively impossible for code of the main processor to be modified by a person during the interval of time.

18. A non-transitory computer readable storage medium on which is embedded one or more computer programs, said one or more computer programs comprising a set of instructions for securing content in a system containing a security processor configured to control access to the content by a main processor, the set of instructions comprising:

instructions that cause the security processor to determine whether the main processor is in an authorized debugging state; and if the main processor is not in the authorized debugging state:

instructions that cause the security processor to determine whether at least one heartbeat is received from the main processor within a predicted time interval; and instructions that causes the security processor to, in response to a determination that at least one heartbeat is not received with the predicted time interval, cease access to the content by the main processor.

\* \* \* \* \*